United States Patent [19]

Zumbach

[11] 3,868,756

[45] Mar. 4, 1975

[54] METHOD FOR PRODUCING IDENTICAL FLAT CARRIERS HAVING REPRESENTATIONS THEREON

[75] Inventor: Bruno Zumbach, Orpund, Switzerland

[73] Assignee: Zumbach Electronic-Automatic, Berne, Switzerland

[22] Filed: Aug. 27, 1971

[21] Appl. No.: 176,767

[30] Foreign Application Priority Data

Aug. 31, 1970 Germany .......... 2043121

[52] U.S. Cl. .......... 29/407, 29/412, 29/624

[51] Int. Cl. .......... B23q 17/00

[58] Field of Search .......... 29/412, 415, 624, 625, 29/417, 407; 83/175, 467, 451

[56] References Cited

UNITED STATES PATENTS

| | | | |
|---|---|---|---|
| 2,665,473 | 1/1954 | Wilckens | 29/412 |
| 2,881,516 | 4/1959 | Hull et al. | 29/407 |
| 2,958,939 | 11/1960 | Turner | 29/407 |
| 3,442,001 | 5/1969 | Canteloube | 29/407 |

*Primary Examiner*—Richard J. Herbst
*Assistant Examiner*—Victor A. DiPalma

[57] ABSTRACT

A method and apparatus for producing identical flat carriers each having an identical representation thereon, by the steps of providing a plurality of individual representations on a flat material in a predetermined mutual relationship, providing at least two reference marks on the flat material in predetermined relationship with respect to the representations, mounting the flat material carrying the representations in a preset position relative to a punch device by means of the reference marks and successively punching out the individual carriers from the flat material by the punch device.

12 Claims, 5 Drawing Figures

INVENTOR 16.8.71

BY

INVENTOR

BY 16.8.71

INVENTOR

BY 16.8.71

METHOD FOR PRODUCING IDENTICAL FLAT CARRIERS HAVING REPRESENTATIONS THEREON

Figure 1:
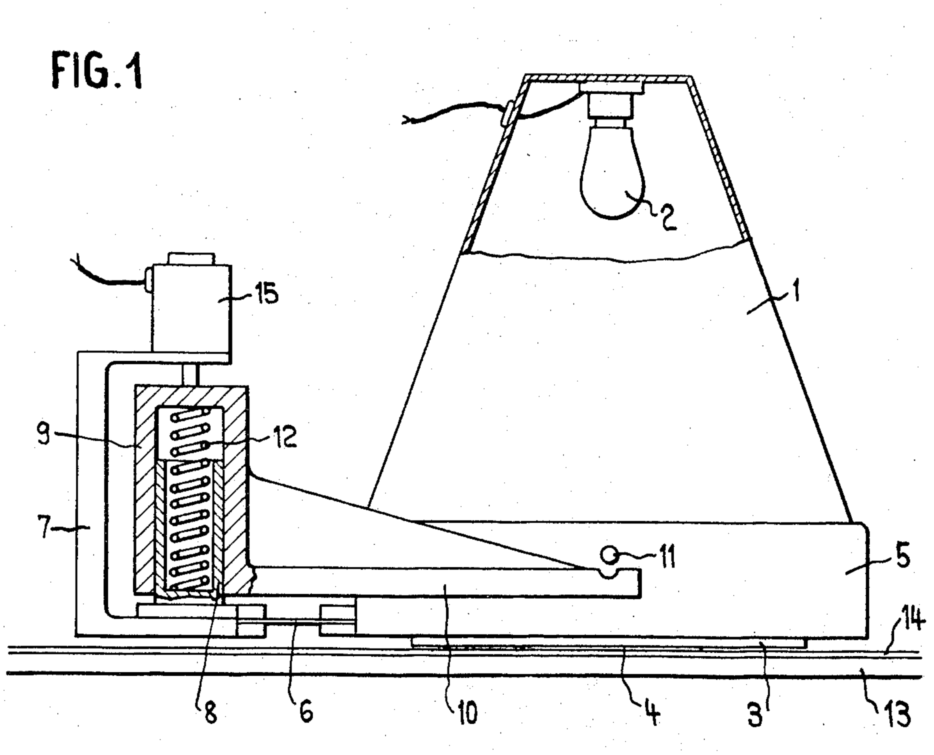

The present invention relates to a method and an apparatus for producing large numbers of flat carriers, such as facias, printed circuits or the like, having identical representations thereon. A flat material is provided by a reproduction process with a plurality of representations thereon and then carriers having an individual representation are cut out. An object of the invention is to reproduce the representations on the carrier and then to cut them out in a rational manner and with the required precision.

In a known method this object is achieved in that each representation has reference holes associated therewith. The position of these holes is pre-printed by means of printing blocks during the printing of the representations. Then for example, during a further operation all the necessary reference holes are drilled, generally two per representation, and then the individual facias are punched out, the two reference holes serving to position the carrier with respect to the punch. This procedure is cumbersome and time wasting. The flat material, such as sheet metal is badly utilised, because considerable space has to be left between the individual representations to accommodate the reference holes.

It is also known for whole sheets or metal sheets to have a plurality of representations printed thereon which are punched out in one operation. This presupposes a very accurate positioning of the sheet or sheet metal both in the printing device and in the punching device. Moreover, the mutual position of all the printing and punching members has to be accurately adjusted. Any change of dimensions of the carrier and/or representations necessitates high equipment costs.

It is an object of the present invention to rationalize and make substantially automatic the production of mass articles such as facias, printed circuits and the like.

In accordance therefore with the present invention there is provided a method for producing flat carriers having an identical representation on the surfaces thereof in which the flat material is clamped by means of preset automatic positional control during the reproduction process, individual representations being produced on the carrier successively in predetermined mutually relative arrangement and with reference to at least two graphically applied reference marks associated with all the representations by means of said positional control, and in which the carrier is held in a predetermined position with respect to the reference marks during the subsequent punching out of the individual carriers from said carrier, and a punch is applied thereagainst, wherein by means of all the positions marked on the carrier during the reproduction process, the punch traverses the carrier and the individual carriers are successively punched out. Since the representations are reproduced and punched out in suitable, preselected and automatically controlled positions, it is only necessary to ensure that accurate corresponding starting positions are set. Thus, for example, it suffices to form two reference holes in the flat material plate which is provided with a plurality of individual representations. Thus, less reference points than representations are required to retain the plate during the punching out of the carriers, such as facias, in an accurate position relative to the punch. To change over to alternative dimensions it is only necessary to perform a corresponding preselection of the adjusting steps, which particularly with digital control this is possible very simply and reliably.

In a particularly advantageous method in accordance with the present invention the individual representations are applied to the carrier during the reproduction process in an identical preset mutual arrangement and the flat carriers are punched out from the carrier with a representation in the same mutual arrangement. This allows all operations to take place fully automatically and a high degree of accuracy is obtained, in that the constantly identical positional control prevents faulty adjustments from occurring both during reproduction and punching out.

Figure 2:
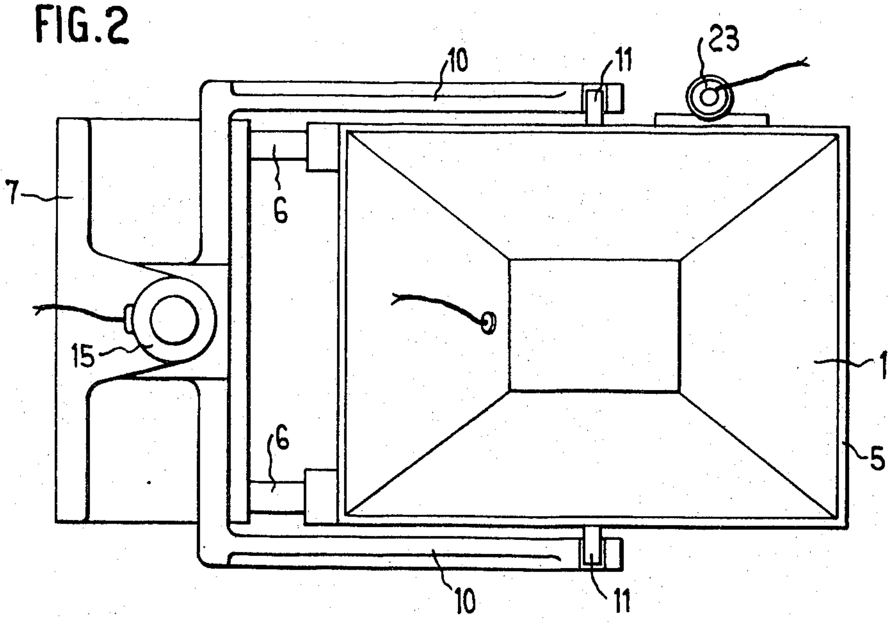
Figure 3:
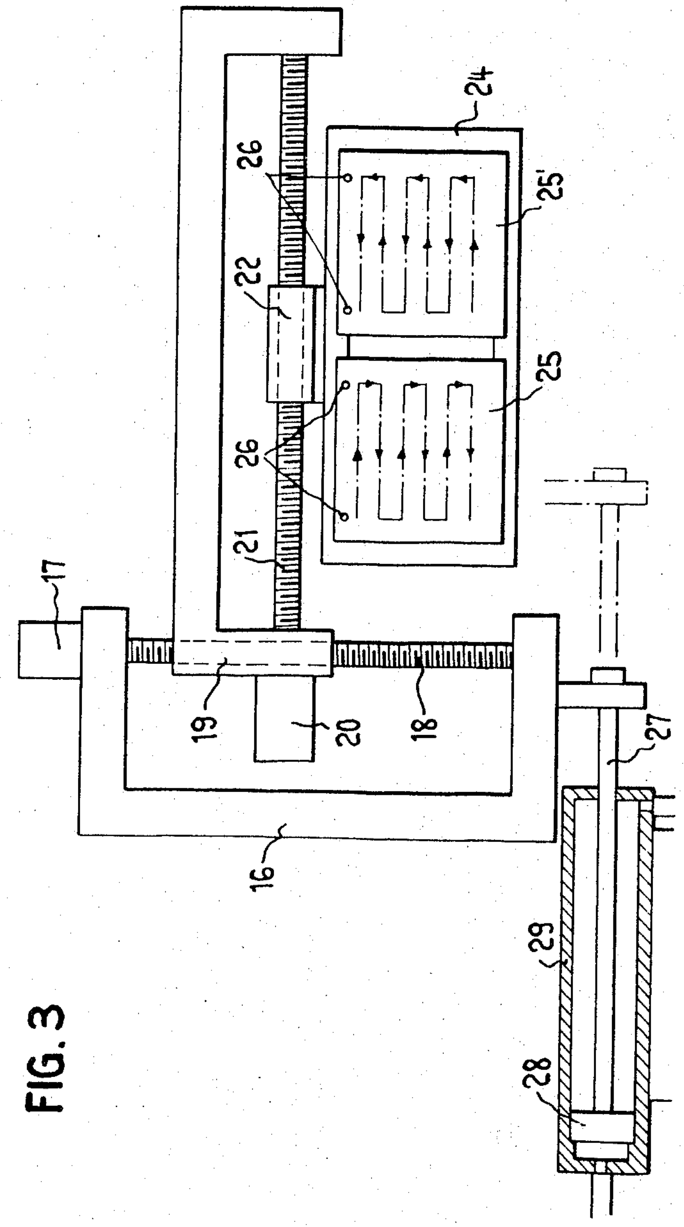
Figure 4:
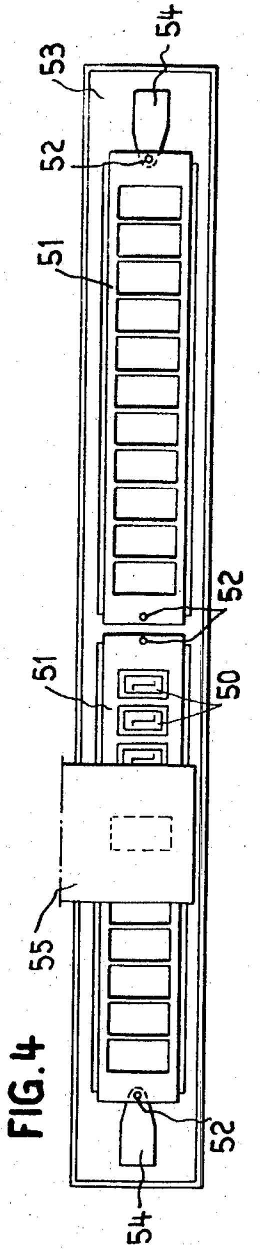
Figure 5:
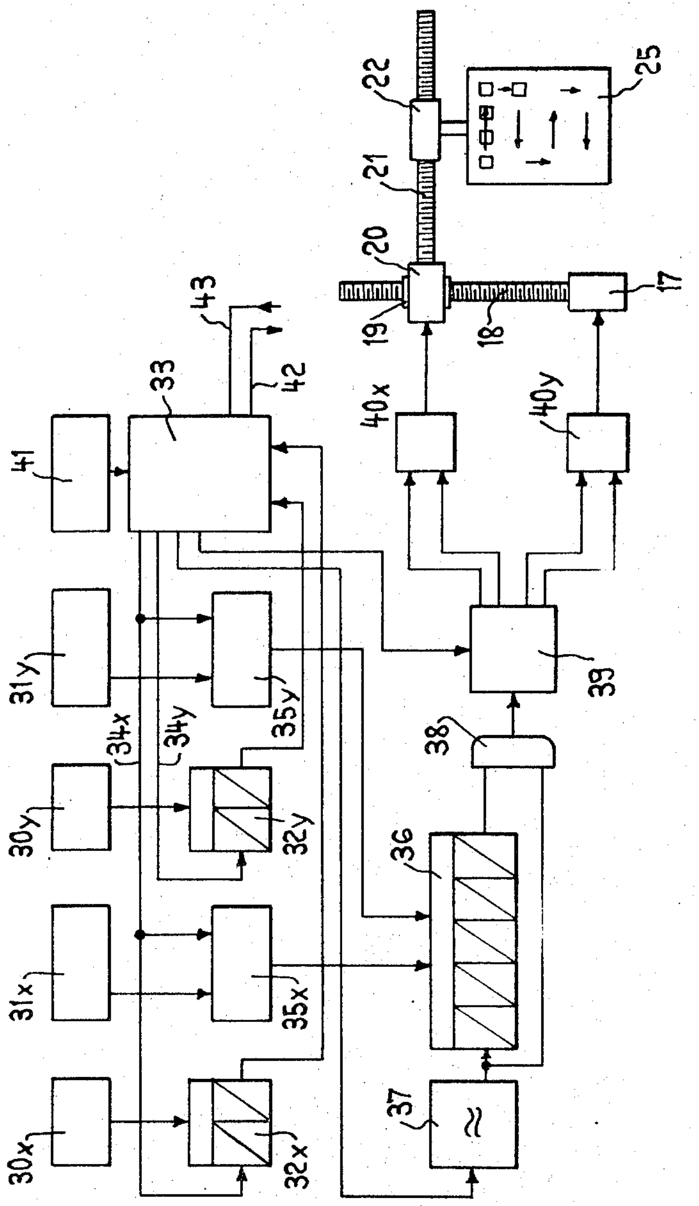

Preferred embodiments of the present invention will hereinafter be described with reference to the accompanying drawings, in which:

FIG. 1 shows a side view partly in section of a device for reproducing representations, FIG. 2 shows a plan view of the device of FIG. 1, FIG. 3 shows schematically a part of an apparatus for punching out carriers, FIG. 4 shows an alternative embodiment for punching out carriers, and FIG. 5 shows a block diagram for controlling the punching operation.

To produce facias, flat plates and the like which carry a representation on the face thereof, for example, inscriptions, divisions into squares, frames and the like, a printing block is first produced by photographic and photo-chemical means which is provided with a plurality of individual representations in a predetermined mutual arrangement. For this purpose, a film is produced from an original drawing or a reduced transparency thereof, which film is then used directly to produce the printing block by photochemical means.

For producing the film the auxiliary device shown in FIGS. 1 and 2 is used. It has a fluoroscopy bell 1 which is closed at the top and carries a light source 2. The lower rectangular opening of the bell 1 is covered by a glass plate 3 retained in a frame 5. An original drawing or a transparency 4 is mounted in a certain position on the underside of the plate 3 and the remainder of the plate is completely covered. The frame 5 is connected by means of two leaf springs 6 to a carrier 7 and is thereby retained to be vertically movable in a certain horizontal position with respect to the carrier 7. A bush 9 is mounted on a sleeve 8 which is connected to the carrier 7. The bush 9 can be displaced in the vertical direction by means of a U-shaped lifting form 10. The arms of the fork 10 engage below pins 11 of the frame 5 and act to lift this frame 5 and the fluoroscopy bell 1 when required. A compression spring 12 normally retains the bush 9 and the lifting fork 10 in an upper end position in which the frame 5 and the glass plate 3 are lifted from a vacuum clamping table 13 or a film 14 clamped thereon. An impact magnet 15 acts to lower the parts 9, 10 and 1–5 into the position shown in the FIGS. 1 and 2, in which the drawing or the transparency 4 is supported on the film 14. A cross wire illumination 23 which permits a reference cross to be exposed on the film 14 is mounted on the frame 5.

Either the carrier 7 or the clamping table 13 is mounted on an adjustable cross slide in accordance with rectangular coordinates whilst the other of these parts is fixedly mounted. Such a cross slide is shown schematically in FIG. 3 in a different connection. A spindle 18 is rotatably mounted in a first frame 16 and can be rotated by means of a stepping motor 17. The spindle 18 acts to displace a second frame 19 in the Y direction. A spindle 21 is rotatably mounted in the frame 19 and is adapted to be driven by a stepping motor 20. The spindle 21 acts to displace a support 22 in the X direction. The clamping table 13 or the carrier 7 is connected to a support, as the support 22, which is adjustable in a similar manner. It is hence possible by suitable positional control to adjust the relative position of the frame 5 or the image or transparency 4 with respect to the clamping table 13 or the film 14 in uniform steps. The precision of the adjustment depends only upon the magnitude of the uniform step and the accuracy of the mechanism.

By means of the automatic positional control individual representations are dipicted line by line on the film 14 by displacing the raised fluoroscopy bell 1 in steps, lowering the bell and then, with the bell lowered switching on the source of illumination 2. The leaf springs 6 provide a readily displaceable simple and cheap connection of the bell 1 to the carrier 7, allowing the bell 1 to be displaced horizontally and vertically with respect to the quasi-rigid film 14. The drawing or transparency 4 can therefore be placed against the film 14 always in parallel therewith and without clearance and in accurate position with respect to the carrier 7. Thus, one line from left to right, e.g. in X direction, is exposed, and then after corresponding adjustment in the Y direction a second line in X direction from right to left is exposed and so on. The cross wire illumination 23 is switched on in two definite positions before or after exposure of the individual representations and exposed on the film a cross wire located at two points outside the representations.

The film is now developed and a printing block produced by photochemical means. With this printing block the plates, e.g. metal plates, are printed, and as well as the individual representations, two cross wires are reproduced. In each of these cross wires one reference hole is drilled. Thus, the plates which are to be punched out to form the individual facias each with a representation, are provided with two reference holes by means of which the plate is suspended on accurately positioned pins of a frame.

FIG. 3 shows schematically a few components of a punch device for punching out facias. A frame 24 is mounted on the above-described support 22. As indicated, it is dimensioned to simultaneously expose two plates 25 and 25', two pins 26 each being provided to suspend the plates. The frame 16 and all components connected therewith including frame 24 are connected to a piston rod 27 which can be displaced by means of a piston 28 and cylinder 29 into two end positions accurately determined by stops. The distance between the end positions accurately corresponds to that between corresponding positions of the plates 25 and 25'. In the region of plate 25' there is a punch, not shown, acting to punch out of the plate a facia.

By means of a positional control system, which corresponds accurately in every respect to that for the above-described exposure of the film, and with the aid of the stepping motors 17 and 20 and the spindles 18 and 21, the support 22 and hence the frame 24 together with the plates 25 and 25' are adjusted step by step in an alternately reversed direction along successive lines and thereby attain a position which accurately corresponds to a position attained when exposing the film 14. The positional control stops briefly and facia carrying an individual representation is punched out. As indicated on the plate 25', punching occurs line for line in an upward direction. When the plate 25' has been processed completely in this manner, the positional control stops in its end position (top left hand position) and the whole system is then displaced by means of the piston 28 to the right and into the position shown in chain-dotted lines in which position the plate 25 is moved under the punch. Since the plates are offset accurately by the displacement path of the piston 28, the plate 25 assumes the starting position for punching out the first representations. Punching out now occurs in reverse, i.e. line by line downwards, as indicated on plate 25 in FIG. 3. Hence no time is lost in returning the positional control into its other end position. Thus, whilst the plate 25 is being processed a new plate 25' may be inserted, so that after all facias have been punched out of the plate 25, a displacement of the frame 24 by means of the piston 28 suffices to bring the newly inserted plate into the starting position such that the processing thereof can be commenced.

Depending upon the production figures to be accomplished, any combinations of units may be provided. For low production a mechanism in accordance with FIG. 3 together with an electronic positional control may suffice, this plant being usable both for reproduction and for punching in that the support 22 can be optionally connected e.g. to the device shown in FIGS. 1 and 2 and the device shown in FIG. 3. It is, however, also possible to connect an electronic system optionally to one of two adjusting devices shown in FIG. 3, one of which serves reproduction and the other punching. It is thus necessary to ensure particularly that the mechanisms are set up as precisely and similarly as possible so that equal electronic information leads to equal mechanical movements and positions. Generally, however, separate plants for reproduction and punching will be provided.

Reproduction may also be effected in a different manner to that described. It is, for example, possible to provide a printing block having an individual representation thereon and to print the plates therefrom whilst automatically controlling the plates, rather than prepare a film for a whole plate and from this etch a printing block for printing a whole plate. In the plant shown in FIG. 3 it would, for example, be conceivable to control further positions with the same movement cycle and to continuously provide plates with representations by means of printing or other reproduction method, which plates are subsequently punched out, if necessary, after a certain waiting time on the same plant.

When producing printed circuits or other mass produced articles methods adapted to these articles may be used, in which the principle is that the reproduction of the representations, whether inscriptions, circuits or others is effected by an identical positional control and the individual carriers each having a representation thereon are subsequently separated and maintained.

It is also possible, instead of reproducing a representation in each position or punching out a carrier, to produce and/or punch out simultaneously per operation a plurality of representations.

Certain punching devices permit only line by line carriers or representations to be cut out. In this case the plates after printing have to be cut in strips each with a line of representations. In this case at the beginning and end of each line a reference point or trapping hole has to be provided. All the representations of the line are positioned with reference to these holes and all the carriers are cut from a strip by reference thereto.

FIG. 4 shows schematically an apparatus for cutting out individual representations 50 from flat material strips 51 which are provided with a reference hole 52 at each end. Two strips 51 are clamped on an elongated table or carrier 53. The table 53, like the table 24 shown in FIG. 3, is displaceable step by step by means of the positional control and is moreover displaceable by a fixed amount relative to the drive, as explained in connection with FIG. 3. At the adjacent inner ends of both strips a pin firmly embedded in the table engages without clearance in one positional hole and hence anchors this end of the strip on the table in a certain position. Pins also engage without clearance at the outer ends of the strips in the positional holes of both strips. Each of these outer pins is mounted on a slide 54 accurately guided in the longitudinal direction of the table 53 and strips 51. The two slides are constantly drawn outwards by a mechanism, not shown, which in the simplest case may be tension springs. The strips 51 are hence stressed for tension in the longitudinal direction. Practice shows that only in this manner can the strips be retained flat so that the representations can be punched out precisely.

Thus, it is essential with this method of operation that the punching out the individual representations occurs away from the end of the strip engaged by the tension, as indicated in FIG. 4. The strip shown on the left clearly shows that some represntations have already been punched out from the particular end held under tension, and that the representations adjacent to the firmly anchored end are punched out last. This arrangement has quite definite significance. It has been shown that, subject to the tractive force required for retaining the strip flat, the strips where representations have already been punched out and consequently very little material remains, are elongated to such an extent that accurate punching out is no longer possible. If, on the other hand the end at which the last representation has been punched out is firmly anchored, then the strip between this anchoring point and the punch 55 has sufficient rigidity that its theoretical elongation is of no practical importance.

On the right in FIG. 4, a blank strip 51 is indicated which is replaced by a new one, whilst representations are punched out from the other strip.

Instead of exposing a film, which subsequently serves to produce a printing plate as shown in FIGS. 1 and 2, a printing plate having a sensitized layer in a manner as explained by way of FIGS. 1 and 2 can be exposed directly with individual representations and reference marks. After the plate has been developed and etched it can be used in the manner described for printing on flat material.

Lines may also replace dots as reference marks. These lines, which are used for accurate positioning of the flat material for punching out the representations, can be photoelectrically scanned, as can dot-like marks, the positioning of the flat material before punching being effected automatically by electronic means. The reference lines, however, may also serve to accurately trim the edges of the flat material, and the edges can subsequently be used as stops for positioning the flat material during the punching out of the representations.

Instead of digital positioning using stepping motors, accurate positioning can also be achieved using predetermined analogous stored steps. Independently thereof, a fine adjustment of the positioning may be required or advantageous, for example, when producing printed circuits in accordance with the relatively inaccurate screen printing method and/or the abovementioned analogous positioning. This fine adjustment can be carried out very simply, by scanning photographically definite point representation and is based on the fact that a simple, quick and accurate correction of the position could be carried out before the representation concerned is punched out. In an analogous control the fine adjustment could be carried out by means of one and the same electromechanical system as the aforesaid predetermined positioning.

Instead of applying the reference marks successively in two positions of the reproduction device with a depicting system 23, it is also possible to provide two depicting systems mounted in fixed relative position and in a certain position relative to the representations to be reproduced. These depicting systems are rendered active in a certain position of the reproduction device and simultaneously plot two reference marks.

FIG. 5 shows a block diagram of an exemplary positional control, the controlled parts 17–22 being given an identical designation to that used in FIG. 3. The circuit includes preselectors 30$x$ and 30$y$ for the preselection of a number of increments and preselectors 31$x$ and 31$y$ for the preselection of the increments, i.e. step numbers in the direction $x$ and $y$. The preselectors 30$x$ and 30$y$ are each connected to an increment counter 32$x$ and 32$y$, the outputs of which act on a preselection control logic 33. Outputs 34$x$ and 34$y$ of this logic 33 act on the increment counters 32$x$ and 32$y$ and on intermediate storage means 35$x$ and 35$y$. The intermediate storage means 35$x$ and 35$y$ are connected to a common step counter 36. The step counter 36 is controlled by an oscillator 37 and the outputs of the counter 36 and oscillator 37 act on the inputs of an AND gate 38. A distributor 39 controlled by the logic 33 conducts the switching impulses with suitable sence of direction to the transposers 40$x$ and 40$y$, which are connected to the stepping motors 17 and 20. A circuit 41 feeds the starting conditions to the logic 33. An output 42 of the logic 33 controls the reproduction device or the punch and an input 43 to the logic 33 feeds a signal thereto indicating the termination of an exposure or punching operation.

The number of adjustments per line is fed into the preselector 30$x$, whilst the preselector 31$x$ is adjusted to the number of individual steps per adjustment, that is the distance in X-direction between the individual representations. Since between each two lines only one adjustment occurs in the Y-direction, the preselector 30$y$ is usually adjusted to 1, whilst the preselector 31$y$ is adjusted to the required step number for displacement by the line distance. In other respects the starting conditions of the conditions are to be accordingly adjusted.

When initiating the automatic cycle via the output 42 a first operation, such as e.g. exposure or punching operation is triggered off. On completion of the operation a signal arrives via the input 43 to the logic 33 which then emits an impulse to the increment counter 32*x* and to the intermediate storage means 35*x* via the output 34*x*. The increment counter 32*x* then advances by a step and the intermediate storage means 35*x* becomes active. Hence the step counter 36 begins to count out the storage means 35*x* and for the duration of this counting impulses from the oscillator 37 arrive at the distributor 39 via the gate 38. This distributor is so controlled by the logic that impulses in a positive sense arrive at the motor 20 via the transposer 40*x* and cause an adjustment in the direction X in a positive sense. When the stored impulse number has been counted out, the gate 38 blocks further impulses. By means of a suitable signal the logic is stimulated to issue a further operating command via the output 42. After completion of the operation, a signal arrives at the logic 33 and a further impulse arrives via the output 34*x* at the increment counter 32*x* and the intermediate storage means 35*x* and a further adjustment in a positive X direction into the next position occurs. When the increment counter 32*x* reaches the number fed into the preselector 30*x*, then it emits an output impulse to the logic, which is influenced thereby such that after the operation has been carried out it emits an impulse via the output 34*y*, so that the support 22 with the member connected thereto is moved in the Y direction by the line spacing. Counting out of the switching steps is effected by the counter 36 which, however, is connected by the effective intermediate storage means 35*y*. Since the increment counter 32*y* is adjusted only to 1, it immediately emits an output impulse, whereby the logic is changed over again to the direction X. If, however, a reversal to Y occurs, so that the distributor 39 in future is so controlled that in the subsequent lines the support is progressively switched gradually in a reversed direction. On completion of the automatic program the logic can switch off, or in the event of automatic processing in accordance with FIG. 3 can accordingly actuate the piston 28 and on receiving an answer initiate the renewed processing by reversed traversing of exactly the same cycle. Manual switches can, of course, also be provided which enable a direct controlling either of the distributor 39 or the transposers 40*x* or 40*y*, as at the beginning of the exposure or processing to effect accurate positioning.

I claim:

1. A method of producing identical flat carriers having each an identical representation thereon, comprising providing reproducing means and a reproduction method wherein a sheet of flat material remains in a predetermined position fixed to supporting means while a number of representations are applied to said flat sheet each in a predetermined position with reference to reference marks common to all representations applied to the sheet by means of said reproducing means controlled from position to position according to a predetermined position control, and a separating method for cutting out of separate flat carriers having each a representation wherein a sheet of flat material previously prepared and carrying representations is applied to a support in a predetermined position relatively to said reference marks and to a cutting tool respectively, whereafter all positions adjusted during the reproduction method are again adjusted one after the other according to a predetermined position control in order to bring each of said representations into a position relatively to the cutting tool for cutting out a flat carrier having a representation.

2. A method as claimed in claim 1, wherein mechanical positioning elements are produced at the site of the reference marks.

3. A method as claimed in claim 1, wherein the positions are approached in one and the same sequence in said reproduction method and in said separating method.

4. A method as claimed in claim 1, wherein the representations are exposed in series on film plates and produced by means of a film plate printing block, and a reference point is photographically applied onto the film plates together with the representations and in a definite position relative to the representations, and wherein the reference points so produced are transmitted to the plate and by means thereof to the flat material whereupon, before cutting out individual carriers from the flat material, positioning holes are drilled at the reference points.

5. A method as claimed in claim 1, wherein reproduction of the representations on the flat material and cutting out of the carrier from the flat material occurs line by line, alternatively in reversed direction.

6. A method as claimed in claim 1, wherein a single row of representations is applied to a strip of flat material, individual representations are then cut out after step by step relative displacement between the flat material strip and said cutting tool, and wherein each strip is subject to tension in its longitudinal direction during the cutting out of the representations therefrom, the strip being firmly anchored at the particular end thereof at which the last representation is cut out, the other end of the strip being held under tension.

7. A method as claimed in claim 6, wherein a positioning hole is formed at each end of the flat material strip, the anchoring of the one end of the strip and the application of tension on the other end of the strip being effected by pins engaging in the positional holes.

8. A method as claimed in claim 1, wherein individual representations and reference marks are produced by direct exposure of a sensitised layer of a printing plate and subsequent development and etching of the plate, whereupon the flat material is imprinted by means of the printing plate.

9. A method as claimed in claim 1, wherein said reference marks are applied as lines along the edges of the flat material and the material is accurately trimmed therealong, the trimmed edges being used as stops for accurately positioning the flat material when the representations are cut from the flat material.

10. A method as claimed in claim 1, wherein the reference marks for the accurate positioning of the flat material are photo-electrically scanned when cutting out the representations from the flat material.

11. A method as claimed in claim 1, wherein a reference mark is applied to the flat material at a predetermined position of the positional control and simultaneously a second reference mark is applied thereto at a predetermined position relative to the first mark.

12. A method as claimed in claim 1, wherein during the cutting out of the carriers, after the material reaches a position determined by the positional control a fine adjustment is effected by means of photo-electric scanning of a certain position of the representation to be punched out.

* * * * *